United States Patent
Jia et al.

(10) Patent No.: US 10,175,261 B2
(45) Date of Patent: Jan. 8, 2019

(54) METHOD, APPARATUS AND MONITORING SYSTEM FOR ACQUISITION OF ROTATING SPEED AND VIBRATION DATA OF MACHINES

(71) Applicant: ANHUI RONDS SCIENCE & TECHNOLOGY INCORPORATED COMPANY, Heifei, Anhui (CN)

(72) Inventors: Weiyin Jia, Hefei (CN); Gang Liu, Hefei (CN); Xianjun Yin, Heifei (CN); Liang Chen, Hefei (CN)

(73) Assignee: ANHUI RONDS SCIENCE & TECHNOLOGY INCORPORATED COMPANY, Heifei (CN)

( * ) Notice: Subject to any disclaimer, the term of this patent is extended or adjusted under 35 U.S.C. 154(b) by 163 days.

(21) Appl. No.: 15/239,765

(22) Filed: Aug. 17, 2016

(65) Prior Publication Data
US 2017/0052062 A1 Feb. 23, 2017

(30) Foreign Application Priority Data
Aug. 17, 2015 (CN) .......................... 2015 1 0504839

(51) Int. Cl.
| | |
|---|---|
| *G01M 13/04* | (2006.01) |
| *G01H 1/00* | (2006.01) |
| *G06F 11/30* | (2006.01) |
| *G01P 3/481* | (2006.01) |
| *G01M 13/02* | (2006.01) |

(52) U.S. Cl.
CPC .............. *G01P 3/481* (2013.01); *G01H 1/003* (2013.01); *G01M 13/028* (2013.01); *G01M 13/045* (2013.01)

(58) Field of Classification Search
CPC ...... G01P 3/481; G01H 1/003; G01M 13/025; G01M 13/028; G01M 13/045; G01N 29/50; G05B 23/024; G05B 23/0221
See application file for complete search history.

(56) References Cited

U.S. PATENT DOCUMENTS

| | | | | | |
|---|---|---|---|---|---|
| 5,206,816 | A | * | 4/1993 | Hill ........................ | G01H 1/006 702/56 |
| 7,860,663 | B2 | * | 12/2010 | Miyasaka .............. | G01H 1/003 702/113 |
| 8,285,498 | B2 | * | 10/2012 | Saarinen ............. | G01M 13/045 702/179 |

(Continued)

*Primary Examiner* — Helen C Kwok
(74) *Attorney, Agent, or Firm* — Maschoff Brennan

(57) ABSTRACT

The invention discloses a method, an apparatus, and a monitoring system for acquisition of a machine's rotating speed and vibration data. A machine rotating speed acquisition apparatus according to the inventive disclosure comprises a speed sensor and a controlling unit. The speed sensor is operative to count the pulses triggered during the rotation of the machine so as to acquire the machine's rotating speed. The controlling unit is operative to record the triggering moment of each pulse. Furthermore, each time when a pulse triggering moment is recorded, a rotating speed time scale message containing that pulse triggering moment is broadcasted to at least one machine vibration data acquisition apparatus, in order for the at least one machine vibration data acquisition apparatus to receive that rotating speed time scale message and record the local time when receiving that message.

17 Claims, 4 Drawing Sheets

(56) References Cited

U.S. PATENT DOCUMENTS

| | | | | |
|---|---|---|---|---|
| 2007/0043533 A1* | 2/2007 | Wiles | G01M 13/025 | |
| | | | 702/183 | |
| 2008/0059117 A1* | 3/2008 | Lindberg | G01H 1/003 | |
| | | | 702/182 | |
| 2008/0069693 A1* | 3/2008 | Malakhova | F03D 7/047 | |
| | | | 416/61 | |
| 2010/0071469 A1* | 3/2010 | Luo | G01M 13/045 | |
| | | | 73/593 | |
| 2010/0299550 A1* | 11/2010 | Bengtson | F03D 7/047 | |
| | | | 713/375 | |
| 2011/0301872 A1* | 12/2011 | Hedin | G01H 1/003 | |
| | | | 702/34 | |
| 2012/0272740 A1* | 11/2012 | Takahashi | G01H 1/003 | |
| | | | 73/660 | |
| 2015/0082887 A1* | 3/2015 | Haschke | G01M 13/045 | |
| | | | 73/587 | |
| 2015/0127272 A1* | 5/2015 | Sundquist | G05B 23/024 | |
| | | | 702/33 | |

* cited by examiner

METHOD, APPARATUS AND MONITORING SYSTEM FOR ACQUISITION OF ROTATING SPEED AND VIBRATION DATA OF MACHINES

CROSS-REFERENCE TO RELATED APPLICATION

This application claims priority from CN Patent Application Serial No. 201510504839.3, filed on Aug. 17, 2015, the entire contents of which are incorporated herein by reference for all purposes.

TECHNICAL FIELD

The invention relates to the field of mechanical devices, and more particularly relates to a method for acquisition of rotating speeds and vibration data of machines, an apparatus and a monitoring system thereof.

BACKGROUND

At present, large rotary mechanical devices are widely applied in the fields of chemical industry, wind power, metallurgy, etc. The structures of the rotary machines, such as wind power generators and oil transfer pumps, are becoming increasingly complicated, so are the environments where they are deployed. Failures of rotary machines may cause accidents and significant losses. With the development of the diagnostic technology for vibration failure features, more and more vibration monitoring devices have been used for monitoring vibration failures of mechanical devices. The existing vibration monitoring mainly employ wired monitoring, which needs in-situ deployment of cables and furthermore acquiring vibration data in a continuous sampling way, so as to conduct diagnostic analysis on the acquired vibration data at a remote server. With the development of the wireless transmission technology, conducting wireless monitoring on vibration data has been gradually employed. In this way, wireless monitoring devices can avoid the trouble of in-situ wiring, especially can avoid the potential safety risks of wired monitoring in, for example, a site requiring high explosion-proof grade.

When employing wireless monitoring schemes in conducting vibration data acquisition and diagnostic analysis, especially when in need of conducting order analysis, it is difficult to conduct effective association analysis on data acquired by different devices.

SUMMARY

To this end, the invention provides a new scheme for wireless acquisition of vibration data, thereby effectively solving at least one of the problems above.

According to the vibration data acquisition scheme of the invention, the mapping between the time references of different acquisition apparatuses is enabled. Therefore, the invention alleviates the difficulty in conducting association analysis on the acquired data due to different time references in synchronous acquisition. The acquisition scheme of the invention provides valid raw data for the subsequent order analysis, thus significantly improving the accuracy of order analysis.

BRIEF DESCRIPTION OF THE DRAWINGS

In order to accomplish the foregoing and related objects, certain illustrative aspects will be described hereby in connection with the following description and drawings, these aspects indicating the various ways in which the principles disclosed herein can be practiced, and all the aspects and equivalents thereto are intended to fall in the scope of the claimed subject matter. Through reading the following detailed description in conjunction with the drawings, the foregoing and other objects, features, and advantages of the disclosure will become more apparent. The same parts and elements are generally denoted with the same reference numbers throughout the disclosure.

DETAILED DESCRIPTION

Figure 1:
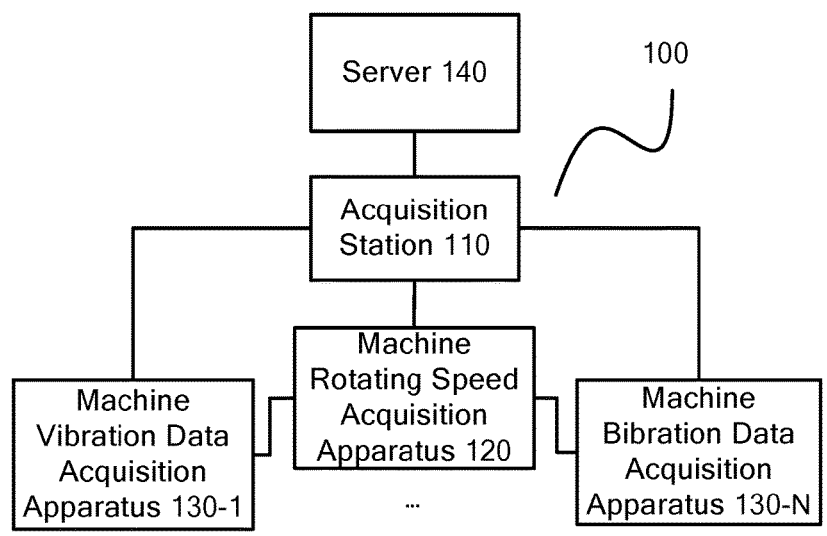
FIG. 1 shows a schematic diagram of a vibration acquisition system 100 according to an embodiment of the invention.

Exemplary embodiments of the disclosure will now be described in more details in conjunction with the drawings. Although exemplary embodiments of the disclosure are shown in the drawings, it should be understood that the disclosure can be implemented in various ways without being restricted to the embodiments set forth herein. On the contrary, these embodiments are provided for understanding the disclosure more thoroughly, and for being able to fully convey the scope of the disclosure to those skilled in the art.

FIG. 1 shows a schematic diagram of a vibration acquisition system 100 according to an embodiment of the invention. The vibration acquisition system 100 includes an acquisition station 110, a machine rotating speed acquisition apparatus 120, machine vibration data acquisition apparatuses 130-1, . . . 130-N (hereinafter referred to as 130), and a server 140. The machine vibration data and rotating speed acquisition apparatuses are generally deployed on a rotary machine in the monitored area. After the acquisition station 110 obtained the acquired vibration and rotating speed data, the data can be processed and the processed data can be transferred to the server 140. The server 140 conducts diagnostic analysis for machine failures using the acquired vibration data and rotating speed data. The rotary machine herein includes but without limitation to such rotary machines as oil transfer pumps, wind power generators, gas turbines, etc. In order to conduct comprehensive monitoring of one or more rotary machines in a monitored area, a vibration acquisition system 100 generally includes a plurality of machine vibration data acquisition apparatuses 130. For example, each motor is provided with a machine rotating speed acquisition apparatus 120, and machine vibration data acquisition apparatuses 130 are configured at different locations of the outer case of the motor. A plurality of machine vibration data acquisition apparatuses 130 can simultaneously measure such monitoring indicators as kurtosis, skewness, etc. at different locations of the measured motor. In an embodiment according to the invention, machine vibration data acquisition apparatuses 130 and machine rotating speed acquisition apparatuses 120 are deployed at the same structural locations of a plurality of rotary machines of the same type, so that comparative analysis can be conducted for vibration data from the same type of motors. The acquisition station 110 can wirelessly communicates with the machine rotating speed acquisition apparatus 120 and the machine vibration data acquisition apparatuses 130. Therefore, the acquisition station 110 can receive the rotating speed data acquired by the machine rotating speed acquisition apparatus 120 and the vibration data acquired by the machine vibration data acquisition apparatuses 130. For example, data transfer can be conducted between the acquisition station 110 and the vibration and rotating speed acquisition apparatuses in a wireless way, such as through Zigbee, etc. The acquisition station 110 can communicate with the server 140 through wireless communications, such as 3G/4G, etc., or through wired communications, such as optical fibers, etc. For example, this server 140 can be a third-party server for remote diagnostic analysis, or can be an internal server of the owner of the monitored machine. In addition, the acquisition station 110, the machine rotating speed acquisition apparatus 120, and the machine vibration data acquisition apparatuses 130 each has an ID sequence number. When the rotating speed or vibration acquisition apparatus is deployed on a rotary machine, the server 140 can associate the ID sequence number of the acquisition apparatus with the rotary machine. In this way, after the acquisition station 110 uploads the rotating speed data and vibration data, the server 140 can associate the rotating speed data and vibration data with the machine according to the ID sequence number corresponding to the rotating speed data and vibration data, so as to conduct failure diagnosis analysis on the status of that machine.

Figure 2:
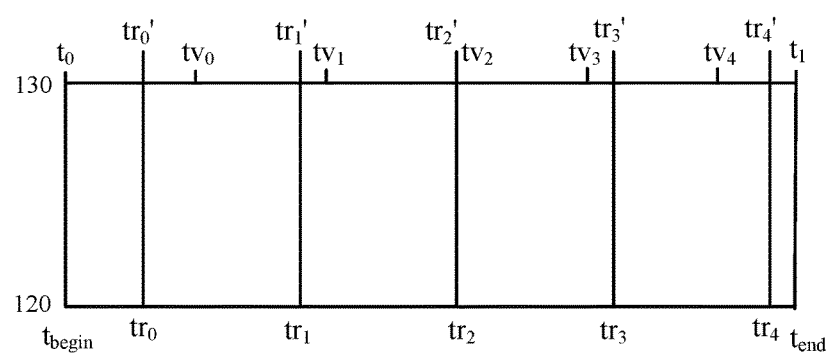
FIG. 2 shows a schematic diagram of a time reference of a machine rotating speed acquisition apparatus 120 being mapped to a machine vibration data acquisition apparatus 130 according to an embodiment of the invention.

FIG. 2 shows a schematic diagram of the time reference of a machine rotating speed acquisition apparatus 120 being mapped to a machine vibration data acquisition apparatus 130 according to an embodiment of the invention.

The machine rotating speed acquisition apparatus 120 is operative to broadcast an acquisition start command and an acquisition end command to the machine vibration data acquisition apparatus 130. Accordingly, in response to receiving the acquisition start command, the machine vibration data acquisition apparatus 130 acquires vibration data for order analysis and records the acquisition moment when the vibration data is captured. According to an embodiment of the invention, at first the machine rotating speed acquisition apparatus 120 acquires the rotating speed of the machine. When the rotating speed is within a predetermined interval, the machine rotating speed acquisition apparatus 120 generates and broadcasts an acquisition start command. The predetermined interval herein is, for example, the interval of rotating speed values from 1300 RPM to 1800 RPM. In addition, the machine rotating speed acquisition apparatus 120 obtains from the server 140 through the acquisition station 110 configuration information for acquiring vibration data. The configuration information includes but without limitation to acquisition length and acquisition frequency. The machine rotating speed acquisition apparatus 120 calculates an acquisition end time point according to the configuration information, and broadcasts an acquisition end command at that end time point. After receiving the acquisition end command, the machine vibration data acquisition apparatus 130 stops acquiring vibration data for order analysis and no longer records the acquisition moment. It should be noticed that sending acquisition start and end commands is not essential to the implementation of the invention. For example, the machine vibration data acquisition apparatus 130 may start acquiring vibration data for order analysis in response to receiving a rotating speed time scale message.

As shown in FIG. 2, $t_{begin}$ is the time point when the machine rotating speed acquisition apparatus 120 sends the acquisition start command, and $t_{end}$ is the time point when the machine rotating speed acquisition apparatus 120 sends the acquisition end command. Accordingly, $t_0$ is the time point when the acquisition start command is received, and $t_1$ is the time point when the acquisition end command is received. Since $t_{begin}$ deviates little from $t_0$ and $t_{end}$ deviates little from $t_1$, the interval from $t_{begin}$ to $t_{end}$ and the interval from $t_0$ to $t_1$ can be regarded as the same time period for purpose of simplifying description, although these intervals might not be exactly consistent. Within the interval from $t_{begin}$ to $t_{end}$, the machine rotating speed acquisition apparatus 120 counts the pulses triggered by the rotation of the machine to acquire the machine's rotating speed. The machine rotating speed acquisition apparatus 120 also records the triggering moment of each pulse. For example, each time the machine rotating speed acquisition apparatus 120 captures a key phase pulse (for example, N key phase pulses indicate machine shaft rotates a revolution), the current time is recorded as the triggering moment of that pulse. $tr_0, \ldots, tr_4$ are triggering moments of the pulses. Furthermore, each time the machine rotating speed acquisition apparatus 120 records a pulse triggering moment, a rotating speed time scale message containing that pulse triggering moment is broadcasted to one or more machine vibration data acquisition apparatuses 130. Accordingly, each time the machine vibration data acquisition apparatus 130 receives a rotating speed time scale message, the local time when receiving this rotating speed time scale message is recorded as a reception moment. For example, within the interval from $t_0$ to $t_1$, $tr_0', \ldots, tr_4'$ are reception moments. Since the pulse triggering moment deviates little from the reception moment corresponding to that pulse moment and that deviation can be corrected, to simplify description, the pulse triggering moment and the reception moment can be regarded as the same moment. Therefore, the machine vibration data acquisition apparatus 130 can establish the time reference mapping to the machine rotating speed acquisition apparatus 120 through the reception moments of rotating speed time scale messages. In addition, the machine vibration data acquisition apparatus 130 is operative to record the acquisition moments each corresponding to a predetermined number of sampled values of vibration data (for example, 2048 sampling points). For example, $tv_0, \ldots, tv_4$ are a series of acquisition moments. The machine vibration data acquisition apparatus 130 stores the vibration data for order analysis in association with the acquisition moments and the reception moments as valid order analysis data. In this way, after obtaining that valid order analysis data through the acquisition station, the server 140 may establish the relation between the machine's rotating phase and the same time reference of the vibration data for order analysis. Therefore, the server 140 can conduct equal angle resampling operations on the vibration data for order analysis (time domain data), thus obtaining the order spectrum for order analysis. For example, $tv_0$, $tr_1'$, $tv_1$, $tr_2'$, and $tv_2$ are of the same time reference. Wherein, the time period from $tr_1'$ to $tr_2'$ corresponds to a full key phase pulse. According to the vibration data for order analysis within the time period from $tv_0$ to $tv_2$ (a series of sampled values), the server 140 can calculate the relation between the time period from $tr_1'$ to $tr_2'$ and the sampled values within that time period. In other words, the server 140 can establish the relation between the phases of the key phase pulses and the sampled values. The server 140 can conduct equal angle resampling and obtain the order spectrum for order analysis. In this way, the vibration monitoring system 100 can unify the time references of the machine rotating speed acquisition apparatus 120 and the machine vibration data acquisition apparatus 130. On the basis of solving the synchronization problem, the vibration monitoring system 100 can acquire valid order analysis data and conduct order diagnosis on the machine.

Figure 3:
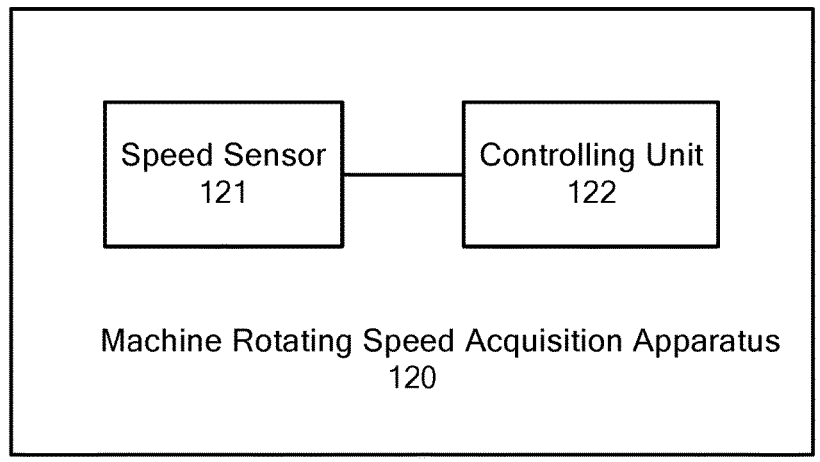
FIG. 3 shows a schematic diagram of a machine rotating speed acquisition apparatus 120 according to an embodiment of the invention.

FIG. 3 shows a schematic diagram of a machine rotating speed acquisition apparatus 120 according to an embodiment of the invention. The machine rotating speed acquisition apparatus 120 is an example of an apparatus for acquiring the rotating speed of a machine's rotating shaft. As shown in FIG. 3, the machine rotating speed acquisition apparatus 120 includes a speed sensor 121 and a controlling unit 122. The speed sensor 121 is operative to count the key phase pulses that trigger the speed sensor 121 during the rotation of the machine, so as to calculate the rotating speed of the machine according to the number of key phase pulses acquired within the predetermined acquisition time. According to an embodiment of the invention, the speed sensor 121 includes but without limitation to an analog to digital conversion circuit and a conditioning circuit (not shown). The analog to digital conversion circuit is operative to digitize the signals acquired by the speed sensor 121. The conditioning circuit is operative to conduct filtering and gain adjustment on the digital signals outputted by the analog to digital converter circuit. The controlling unit 122 is operative to record the triggering moments of each pulse. According to another embodiment of the invention, each time the speed sensor 121 captures a key phase pulse, it sends that key phase pulse to the controlling unit 122. When obtaining the key phase pulse, the controlling unit 122 records the current time as the pulse triggering moment. The controlling unit 122 is also operative to broadcast a rotating speed time scale message containing that pulse triggering moment to the machine vibration data acquisition apparatus 130. Each time the controlling unit 122 obtains a pulse triggering moment, it sends a rotating speed time scale message to the machine vibration data acquisition apparatus 130. There could be one or more machine vibration data acquisition apparatuses 130 which receive the rotating speed time scale message. For example, when the machine rotating speed acquisition apparatus 120 sends rotating speed time scale messages to the machine vibration data acquisition apparatus 130, the following message format is used:

| $t_{n-3}$ | $t_{n-2}$ | $t_{n-1}$ | $t_n$ | N |
| --- | --- | --- | --- | --- | where $t_n$ is the currently obtained pulse triggering moment, $t_{n-1}$, $t_{n-2}$, and $t_{n-3}$ are the pulse triggering moments of 3 adjacent pulses before $t_n$ and N is the sending sequence number. This sequence number is the sending order designated by the controlling unit 122 when sending the rotating speed time scale message. Therefore, one or more machine vibration data acquisition apparatuses 130 can use the rotating speed time scale messages to convert the time reference of the acquired vibration data for order analysis to the same time reference as the machine rotating speed acquisition apparatus 120. In this way, the synchronization of time references is achieved between different apparatuses in the vibration monitoring system 100. Furthermore, a precise synchrony analysis can be conducted on the rotating speed data and the vibration data acquired in the vibration monitoring system 100, thus significantly improving the effectiveness of the acquired data when conducting diagnostic analysis.

In addition, the controlling unit 122 is also operative to send acquisition start commands and acquisition end commands to the machine vibration data acquisition apparatus 130. According to an embodiment of the invention, the controlling unit 122 monitors the machine's rotating speed, and when the rotating speed reaches a high speed interval (for example, rotating speed values from 1300 RPM to 1800 RPM), the controlling unit 122 sends an acquisition start command to the machine vibration data acquisition apparatus 130, in order for the machine vibration data acquisition apparatus 130 to start acquiring vibration data for order analysis. According to the predetermined acquisition length in time (for example, 30 seconds) of order analysis, the controlling unit 122 starts counting time since sending the acquisition start command. Furthermore, after the counted length in time reaches the predetermined length in time of order analysis acquisition, an acquisition end command is sent to the machine vibration data acquisition apparatus 130. According to another embodiment of the invention, the controlling unit 122 determines an acquisition end time according to the configuration information containing acquisition length and acquisition frequency set by the server 140. The controlling unit 122 broadcasts an acquisition end command to one or more machine vibration data acquisition apparatuses 130 at the acquisition end time. After sending the acquisition end command, the controlling unit 122 will instruct the speed sensor 121 to stop acquiring rotating speeds. The controlling unit 122 will also stop broadcasting rotating speed time scale messages.

In addition, the acquisition end command broadcasted by the controlling unit 122 includes the number of pulse triggering moments which have been broadcasted by the controlling unit 122 since the acquisition start command. In this way, the machine vibration data acquisition apparatus 130 is able to determine the reception condition of the rotating speed time scale messages, for example to determine the number of rotating speed time scale messages that are not received.

Figure 4:
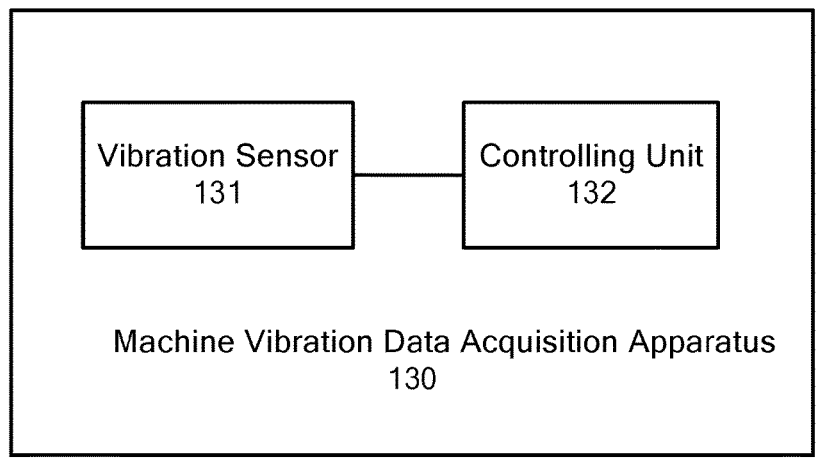
FIG. 4 shows a schematic diagram of a machine vibration data acquisition apparatus 130 according to an embodiment of the invention.

FIG. 4 shows a schematic diagram of a machine vibration data acquisition apparatus 130 according to an embodiment of the invention. As shown in FIG. 4, the machine vibration data acquisition apparatus 130 includes a vibration sensor 131 and a controlling unit 132.

The vibration sensor 131 is operative to measure the acceleration value of the machine's vibration. Optionally, the vibration sensor 131 can also calculate one or more of the parameters such as vibration displacement, vibration amplitude, etc. According to an embodiment of the invention, the vibration sensor 131 includes but without limitation to an analog to digital conversion circuit and a conditioning circuit (not shown). The analog to digital conversion circuit is operative to digitize the acquired signals. The conditioning circuit is operative to conduct filtering and gain adjustment on the digital signals outputted by the analog to digital converter circuit.

In addition, the vibration sensor 131 can also record the local acquisition times of the vibration data as the acquisition moments of the vibration data. In an embodiment, the vibration sensor 131 records the time value of the current sampling point as an acquisition moment at an interval of a predetermined number of sampling points (for example, 2048 sampling points). Between starting and ending the acquisition of vibration data, the vibration sensor 131 is able to record multiple acquisition moments.

The controlling unit 132 is able to receive from the machine rotating speed acquisition apparatus 120 rotating speed time scale messages containing pulse triggering moments, and record the reception moments when the rotating speed time scale messages are received. In this way, a mapping can be established between the time reference of the rotating speed acquisition apparatus 120 and the time reference of the vibration acquisition apparatus 130.

Optionally, when receiving rotating speed time scale messages of, e.g. $tr_0, \ldots, tr_4$ moments, the controlling unit 132 will also extract therefrom the sending sequence number N of the pulse triggering moment. After receiving the acquisition end command, the controlling unit 132 extracts therefrom the number of pulse triggering moments that have been broadcasted by the machine rotating speed acquisition apparatus 120 since the acquisition start command (for example, the number of pulse triggering moments that have been broadcasted in FIG. 2 is 4). The controlling unit 132 compares the number of pulse triggering moments that have been broadcasted with the total number of reception moments, so as to determine whether the number of loss of the rotating speed time scale messages (i.e., the number of rotating speed time scale messages that are not received by the controlling unit 132) is greater than a threshold (for example, a threshold of 2 in FIG. 2). If the number of loss is less than the threshold, the controlling unit 132 can conduct a linear fitting based on the reception moments of the rotating speed time scale messages that are not lost and the corresponding pulse triggering moments, so as to calculate the reception moments of the rotating speed time scale messages that are lost. The controlling unit 132 can store in association the pulse triggering moments, the reception moments of rotating speed time scale messages, the vibration data for order analysis, and the acquisition moments as valid order analysis data. The data format of the valid order analysis data is not herein limited, and various data formats can be applied in the technical scheme according to the invention. In this way, after obtaining the valid order analysis data, the server 140 can conduct order analysis diagnosis. Accordingly, if the number of loss is greater than the threshold, that is, the reception times of the lost pulses cannot be calculated according to the data received, the controlling unit 132 will store the pulse triggering moments, the reception moments of rotating speed time scale messages, the vibration data for order analysis, and the acquisition moments as invalid order analysis data.

In addition, if the controlling unit 132 does not receive the acquisition end command within a predetermined length of time (for example, 20 seconds), it instructs the vibration sensor 131 to stop acquisition operations. Furthermore, the controlling unit 132 will store the pulse triggering moments, the reception moments of rotating speed time scale messages, the vibration data for order analysis, and the acquisition moments as invalid order analysis data. In addition, the controlling unit 132 is able to send the valid order analysis data to the acquisition station 110, and can also choose to upload the invalid order analysis data.

Figure 5:
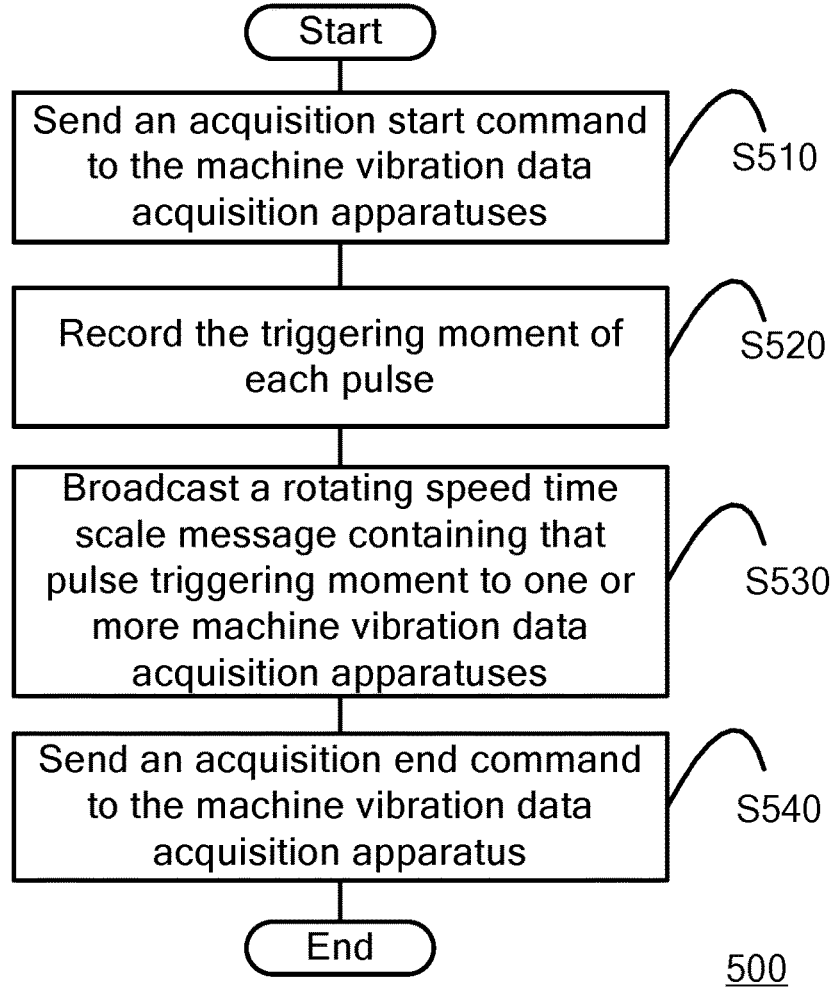
FIG. 5 shows a flowchart of a machine rotating speed acquisition method 500 according to an embodiment of the invention.

FIG. 5 shows a flowchart of a rotating speed acquisition method 500 according to an embodiment of the invention. The rotating speed acquisition method 500 is operative to be performed in the machine rotating speed acquisition apparatus 120.

As shown in FIG. 5, the method 500 begins with a step S510, in which an acquisition start command is sent to the machine vibration data acquisition apparatus 130. Therefore, the machine vibration data acquisition apparatus 130 acquires vibration data for order analysis in response to the acquisition start command. According to an embodiment of the invention, the acquisition start command in the step S510 is generated based on the machine's rotating speed. Specifically, at first the pulses that trigger the speed sensor 121 during the rotation of the machine are counted, then the level of rotating speed is determined. That is, according to the current rotating speed, it is determined whether the machine vibration data acquisition apparatus 130 needs to acquire the vibration data for order analysis or not. If the level of rotating speed meets certain condition(s) (for example, the machine's rotating speed is determined to be high, the high rotating speed being in the interval from 1300 RPM to 1800 RPM), the machine rotating speed acquisition apparatus 120 generates an acquisition start command. After sending the acquisition start command to one or more machine vibration data acquisition apparatus 130, the method 500 performs a step S520. In the step S520, the triggering moment of each pulse is recorded. Each time a pulse triggering moment is recorded, the method 500 performs a step S530, in which a rotating speed time scale message containing that pulse triggering moment is broadcasted to one or more machine vibration data acquisition apparatuses 130, in order for the one or more machine vibration data acquisition apparatuses 130 to receive that rotating speed time scale message and record the local time when receiving that message. In the step S530, the sending sequence number of the pulse triggering moment is designated as well. The rotating speed time scale message that is broadcasted also includes the sending sequence number of the pulse triggering moment and the adjacent pulse triggering moment(s) before that pulse triggering moment.

According to an embodiment of the invention, the method 500 further includes a step S540, in which an acquisition end command is sent to the machine vibration data acquisition apparatus 130. Therefore, the machine vibration data acquisition apparatus 130 stops acquiring vibration data for order analysis according to the acquisition end command. The acquisition end command herein can be generated according to a predetermined acquisition length in time. Specifically, the machine rotating speed acquisition apparatus 130 determines an acquisition end time according to the acquisition length and acquisition frequency determined by the server 140. When the acquisition end time is reached, the machine rotating speed acquisition apparatus 130 generates an acquisition end command. In addition, the acquisition end command sent in the step S540 also includes the number of pulse triggering moments that have been broadcasted since the acquisition start command. The specific implementation of the method 500 is consistent with the machine rotating speed acquisition apparatus 120 as shown in FIG. 3, and the detailed description thereof will be omitted here. It should be noted that sending acquisition start and end commands is not essential to the implementation of the invention.

Figure 6:
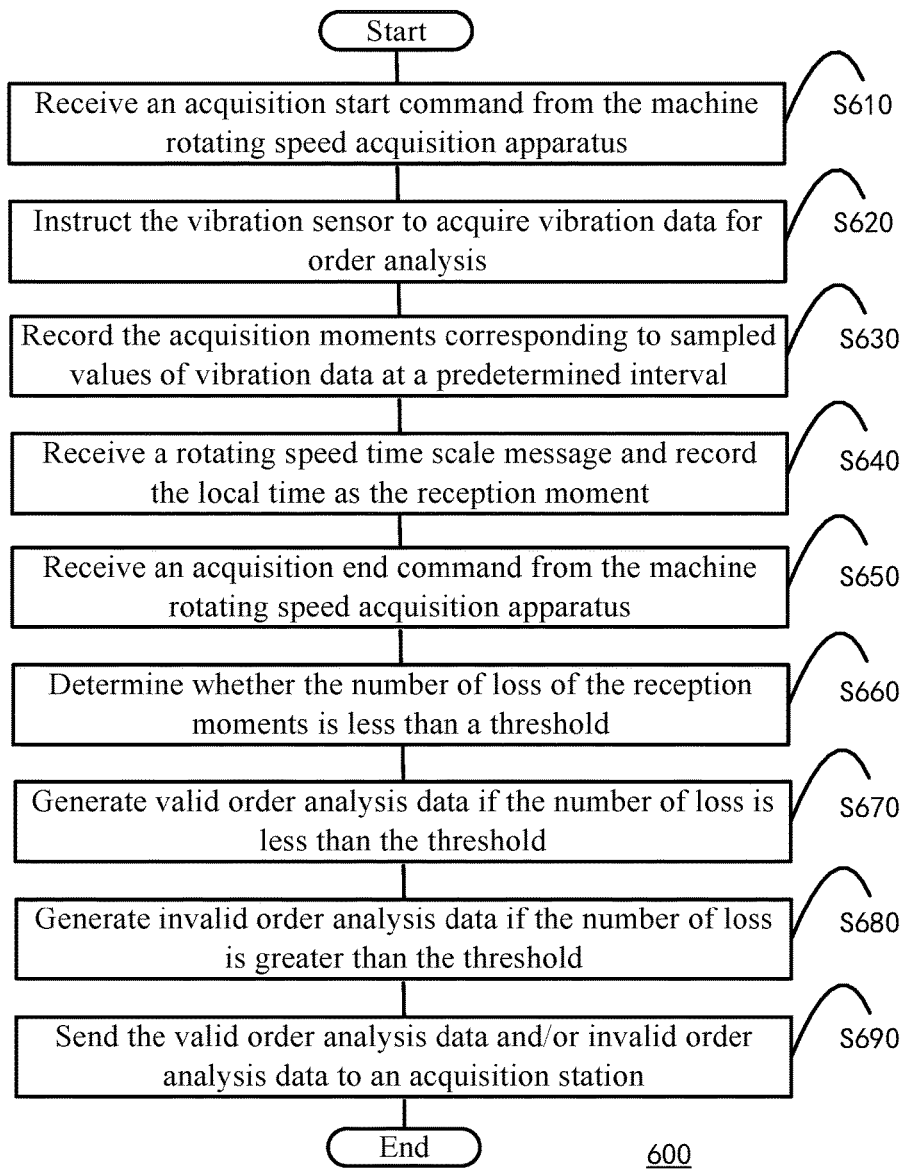
FIG. 6 shows a flowchart of a machine vibration data acquisition method 600 according to an embodiment of the invention.

FIG. 6 shows a flowchart of a machine vibration data acquisition method 600 according to an embodiment of the invention. The method 600 is operative to be performed in the machine vibration data acquisition apparatus 130.

As shown in FIG. 6, optionally the method 600 begins with a step S610, in which an acquisition start command is received from the machine rotating speed acquisition apparatus 120. The method then proceeds to a step S620, in which the vibration sensor is instructed to acquire the vibration data for order analysis. The method 600 also includes a step S630, in which the acquisition moments each corresponding to a predetermined number of sampled values of vibration data are recorded. According to an embodiment of the invention, the method 600 further includes a step S640, in which a rotating speed time scale message is received from the machine rotating speed acquisition apparatus, and the reception moment when receiving that rotating speed time scale message is recorded. In addition, the method 600 further includes a step S650, in which an acquisition end command is received from the machine rotating speed acquisition apparatus. After performing the step S650, the method 600 does not perform the steps S620, S630, and S640. It should be noted that the steps S610 and S650 are not essential to the implementation of the invention.

Optionally, the rotating speed time scale message received in the step S640 also contains the sending sequence numbers of the adjacent pulse triggering moment(s) before that pulse triggering moment and that pulse triggering moment. In the step S650, the acquisition end command also includes the number of pulse triggering moments that have been broadcasted since the acquisition start command. In this way, when performing the step S660, the method 600 is able to determine whether the number of loss of the reception moments of the rotating speed time scale messages is less than a threshold according to the number of pulse triggering moments that have been broadcasted.

If that number of loss is less than the threshold, the method 600 performs a step S670, in which a linear fitting is conducted based on the reception moments of the rotating speed time scale messages that are not lost and the corresponding pulse triggering moments, so as to calculate the reception moments of the rotating speed time scale messages that are lost. The step S670 further includes storing in association the pulse triggering moments, the reception moments of rotating speed time scale messages, the vibration data for order analysis, and the acquisition moments as valid order analysis data, in order for the server 140 that obtains the valid order analysis data to conduct equal angle resampling operations when performing diagnostic analysis.

If the number of loss is greater than the threshold, the method 600 performs a step S680. According to an embodiment of the invention, in the step S680, the pulse triggering moments, the reception moments of rotating speed time scale messages, the vibration data for order analysis, and the acquisition moments are stored as invalid order analysis data.

Optionally, in the step S650, if the acquisition end command is not received within a predetermined length of time, the method 600 stops performing the steps S620, S630, and S640. The method 600 performs the step S680. In addition, the method 600 also includes a step S690, in which the valid order analysis data is sent to the acquisition station. The specific implementation of the method 600 is consistent with the machine vibration data acquisition apparatus 130 as shown in FIG. 4, and the detailed description thereof will be omitted here.

Although the invention has been described according to a limited number of embodiments, however, those skilled in the art that benefit from the foregoing description should understand that other embodiments can be conceived in the scope of the invention hereby described. In addition, it should be noticed that the wording used in the specifications is chosen for the purposes of readability and teaching, and not for explaining or limiting the subject matter of the invention. Therefore, many modifications and variations will be obvious to those of ordinary skill in the art without departing from the scope and spirit of the claims that follow. As for the scope of the invention, the disclosure of the invention is illustrative and not limiting, and the scope of the invention is defined by the claims that follow.

The invention claimed is:

1. A machine rotating speed acquisition apparatus of a vibration acquisition system, the vibration acquisition system further comprises at least one machine vibration data acquisition apparatus, the machine rotating speed acquisition apparatus comprising:
   a speed sensor operative to count pulses triggered during a rotation of a machine so as to acquire a rotating speed of the machine;
   a controlling unit operative to
      record a triggering moment of each pulse,
      each time the pulse triggering moment is recorded, broadcast a rotating speed time scale message containing the pulse triggering moment to said at least one machine vibration data acquisition apparatus, in order for said at least one machine vibration data acquisition apparatus to receive the rotating speed time scale message and record a local receive time when receiving the rotating speed time scale message, and establish a time reference mapping to the machine rotating speed acquisition apparatus based on the local receive time and the received rotating speed time scale message;
      generate an acquisition start command when the rotating speed of the machine is within a predetermined interval;
      send the acquisition start command to said at least one machine vibration data acquisition apparatus, in order for said at least one machine vibration data acquisition apparatus to acquire vibration data for order analysis in response to the received acquisition start command;
      calculate an acquisition end time point according to a configuration information, wherein the configuration information includes acquisition length and acquisition frequency; and
      send an acquisition end command at the calculated acquisition end time point to said at least one machine vibration data acquisition apparatus, in order for said at least one machine vibration data acquisition apparatus to stop acquiring vibration data for order analysis according to the received acquisition end command.

2. A machine vibration data acquisition apparatus of a vibration acquisition system, the vibration acquisition system further comprises a machine rotating speed acquisition apparatus, the machine vibration data acquisition apparatus comprising:
   a vibration sensor operative to acquire vibration data of a machine for order analysis; and
   a controlling unit operative to
      record one or more acquisition moments, each acquisition moment being recorded when the vibration data has been acquired for a predetermined times,
      receive a rotating speed time scale message from the machine rotating speed acquisition apparatus, said rotating speed time scale message containing a pulse triggering moment during a rotation of the machine;
      record a local receive time when receiving said rotating speed time scale message; and
      establish a time reference mapping to the machine rotating speed acquisition apparatus based on the local receive time and said rotating speed time scale message.

3. The machine vibration data acquisition apparatus of claim 2, said controlling unit is further operative to:
   receive an acquisition start command from the machine rotating speed acquisition apparatus, and instruct the vibration sensor to acquire the vibration data of the machine according to the acquisition start command; and
   receive an acquisition end command from the machine rotating speed acquisition apparatus, and instruct the vibration sensor to stop acquiring the vibration data of the machine according to the end command.

4. The machine vibration data acquisition apparatus of claim 3, wherein said acquisition end command contains a number of pulse triggering moments that have been broadcasted since the acquisition start command being generated, said controlling unit is further operative to:
   according to the number of pulse triggering moments that have been broadcasted and a number of the received rotating speed time scale messages, determine a loss number corresponding to a number of the rotating speed time scale messages not being received by the machine vibration data acquisition apparatus; and
   if the loss number is less than a threshold, conduct a linear fitting based on the local receive time not being lost and the corresponding pulse triggering moments, so as to calculate the local receive time of the corresponding rotating speed time scale message not being received by the machine vibration data acquisition apparatus; and store in association the pulse triggering moments, the local receive time, the vibration data of the machine, and the acquisition moment as a valid order analysis data.

5. The machine vibration data acquisition apparatus of claim 4, said controlling unit is further operative to:
   if the loss number is greater than said threshold, store the pulse triggering moments, the local receive time, the vibration data of the machine, and the acquisition moments as an invalid order analysis data.

6. The machine vibration data acquisition apparatus of claim 4, said controlling unit is further operative to send the valid order analysis data to an acquisition station of the vibration acquisition system.

7. A machine rotating speed acquisition method, which is suitable for being executed in a machine rotating speed acquisition apparatus of a vibration acquisition system, the vibration acquisition system further comprises at least one machine vibration data acquisition apparatus, comprising:
   acquiring a rotating speed of a machine by counting pulses triggered by a speed sensor during a rotation of the machine;
   recording a triggering moment of each pulse;
   each time the pulse triggering moment is recorded, broadcasting a rotating speed time scale message containing the pulse triggering moment to said at least one machine vibration data acquisition apparatus, in order for said at least one machine vibration data acquisition apparatus to receive the rotating speed time scale message and record a local receive time when receiving the rotating speed time scale message, and establish a time reference mapping to the machine rotating speed acquisition apparatus based on the local receive time and the received rotating speed time scale message;
   generating an acquisition start command when the rotating speed of the machine is within a predetermined interval;
   sending the acquisition start command to said at least one machine vibration data acquisition apparatus, in order for said at least one machine vibration data acquisition apparatus to acquire vibration data for order analysis in response to the received acquisition start command;
   calculating an acquisition end time point according to a configuration information, wherein the configuration information includes acquisition length and acquisition frequency; and
   sending an acquisition end command at the calculated acquisition end time point to said at least one machine vibration data acquisition apparatus, in order for said at least one machine vibration data acquisition apparatus to stop acquiring vibration data for order analysis according to the received acquisition end command.

8. The machine rotating speed acquisition method of claim 7, wherein said rotating speed time scale message further contains a sending sequence numbers of the pulse triggering moment and at least one adjacent pulse triggering moment before the pulse triggering moment.

9. The machine rotating speed acquisition method of claim 7, wherein said acquisition end command contains a number of pulse triggering moments that have been broadcasted since the acquisition start command being generated.

10. A machine vibration data acquisition method, which is suitable for being executed in a machine vibration data acquisition apparatus of a vibration acquisition system, the vibration acquisition system further comprises a machine rotating speed acquisition, comprising:
    acquiring vibration data of a machine for order analysis through a vibration sensor;
    recording one or more acquisition moments, each acquisition moment being recorded when the vibration data has been acquired for a predetermined times;
    receiving a rotating speed time scale message from the machine rotating speed acquisition apparatus, said rotating speed time scale message containing a pulse triggering moment during a rotation of the machine;
    recording a local receive time when receiving the rotating speed time scale message; and
    establishing a time reference mapping to the machine rotating speed acquisition apparatus based on the local receive time and said rotating speed time scale message.

11. The machine vibration data acquisition method of claim 10, further comprising:
    receiving an acquisition start command from the machine rotating speed acquisition apparatus, and instruct the vibration sensor to acquire the vibration data of the machine according to the acquisition start command; and
    receiving an acquisition end command from the machine rotating speed acquisition apparatus, and instruct the vibration sensor to stop acquiring the vibration data of the machine according to the acquisition end command.

12. The machine vibration data acquisition method of claim 11, wherein said rotating speed time scale message further contains a sending sequence numbers of the pulse triggering moment and at least one adjacent pulse triggering moment before the pulse triggering moment.

13. The machine vibration data acquisition method of claim 11, wherein said acquisition end command contains a number of pulse triggering moments that have been broadcasted since the acquisition start command being generated.

14. The machine vibration data acquisition method of claim 13, further comprising:
    according to the number of pulse triggering moments that have been broadcasted and a number of the received rotating speed time scale messages, determining a loss number corresponding to the rotating speed time scale messages not being received by the machine vibration data acquisition apparatus; and if the loss number is less than a threshold, conducting a linear fitting based on the local receive time not being lost and the corresponding pulse triggering moments, so as to calculate the local receive time of the corresponding rotating speed time scale message that are lost; and storing in association the pulse triggering moments, the local receive time, the vibration data of the machine, and the acquisition moments as a valid order analysis data.

15. The machine vibration data acquisition method of claim 14, further comprising:

if the loss number is greater than said threshold, storing the pulse triggering moments, the local receive time, the vibration data of the machine, and the acquisition moments as an invalid order analysis data.

16. The machine vibration data acquisition method of claim 13, further comprising:

if said acquisition end command is not received within a predetermined length of time, instructing the vibration sensor to stop acquisition operations; and storing the pulse triggering moments, the local receive time, the vibration data of the machine, and the acquisition moments as an invalid order analysis data.

17. The machine vibration data acquisition method of claim 14, further comprising: sending the valid order analysis data to an acquisition station of the vibration acquisition system.

* * * * *